May 24, 1960 R. W. COOK 2,937,812
LIQUID SPRINKLING DEVICE
Filed Dec. 5, 1958 2 Sheets-Sheet 1

INVENTOR.
RALPH W. COOK,
BY
McMorrow, Berman & Davidson
ATTORNEYS.

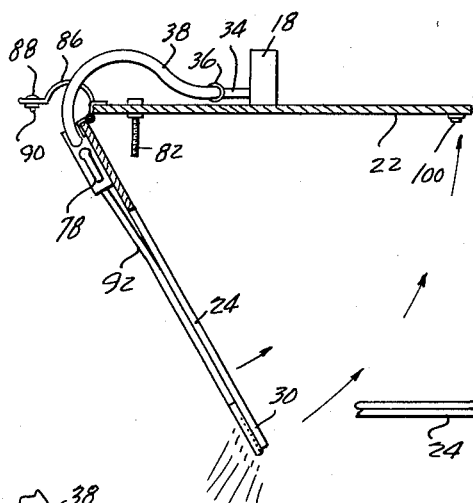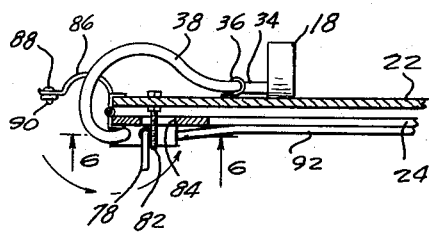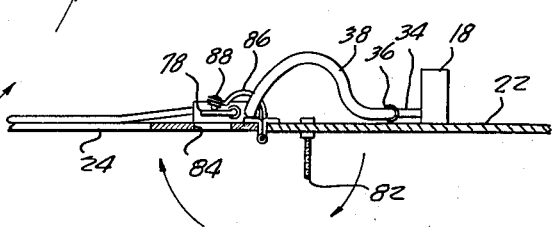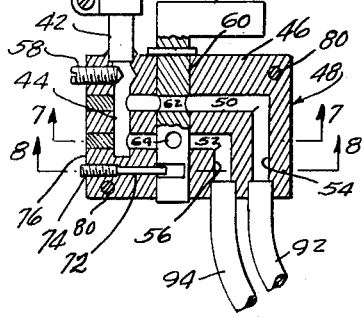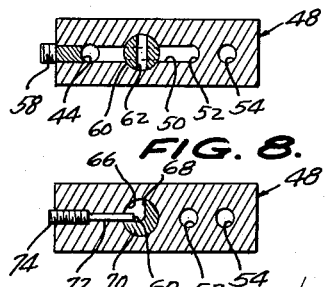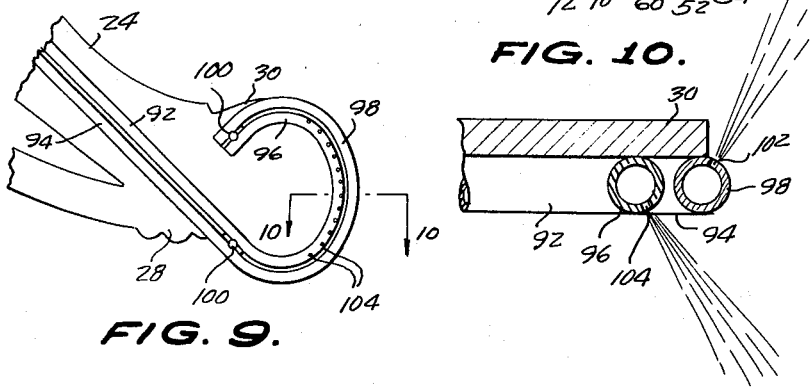

United States Patent Office 2,937,812
Patented May 24, 1960

2,937,812

LIQUID SPRINKLING DEVICE

Ralph W. Cook, Hewett, W. Va.

Filed Dec. 5, 1958, Ser. No. 778,427

11 Claims. (Cl. 239—255)

This invention relates to sprinkling devices and, more specifically, to a lawn sprinkling mechanism including a simulated figure, preferably that of a human being, the figure having an arm thereof which is mounted for swinging movement from side-to-side and has secured thereto a sprinkler nozzle or other similar attachments designed to eject water therefrom in the form of a spray over a relatively wide area and in an arc of a circle.

An object of this invention is to provide a lawn sprinkler including a swinging arm which, during movement thereof, simulates in appearance a life-like object engaged in the watering of a lawn for the enjoyment and amusement of onlookers.

Another object of this invention is to provide a lawn sprinkled of the type generally referred to supra, including a swinging arm pivotally mounted for movement from side-to-side on the simulated figure together with means for automatically reversing the direction of the movement of the arm at predetermined points in its path of swinging movement.

This invention contemplates, as a still further object thereof, the provision of a lawn sprinkler of the type generally referred to above, the lawn springler being non-complex in construction and assembly, inexpensive to manufacture and maintain, and durable in use.

Other and further objects and advantages of the instant invention will become more evident from a consideration of the following specification when read in conjunction with the annexed drawings, in which:

Figure 3 is an enlarged detail cross-sectional view of the lawn sprinkler, Figure 3 being taken substantially on the horizontal plane of line 3—3 of Figure 1, looking in the direction of the arrows;

Figure 4 is an enlarged fragmentary detail cross-sectional view similar to Figure 3, but showing the pivotal arm as being moved to its one extreme position and extending transversely across the front side of the simulated figure;

Figure 5 is an enlarged fragmentary detail cross-sectional view illustrating the arm of the simulated figure as being moved to its other extreme position, that is, substantially into the plane of the torso of the figure;

Figure 6 is an enlarged detail cross-sectional view of the fluid actuating reversing valve for effecting the movement of the pivoted arm from its position as shown in Figure 4 to its position as is illustrated in Figure 5;

Figure 7 is a detail cross-sectional view, taken substantially on the horizontal plane of line 7—7 of Figure 6, looking in the direction of the arrows, and showing the valve stem as being rotated ninety degrees from its position as illustrated in Figure 6;

Figure 8 is a detail cross-sectional view taken substantially on the horizontal plane of line 8—8 of Figure 6, looking in the direction of the arrows, and illustrating means for limiting the rotation of the valve stem within an arc of substantially ninety degrees;

Figure 9 is an enlarged, fragmentary, rear elevational view of the free end portion of the pivotal arm and illustrating the water spray nozzles as connected thereto; and, Figure 10 is an enlarged detail cross-sectional view taken substantially upon the horizontal plane of line 10—10 of Figure 9, looking in the direction of the arrows.

Figure 1:
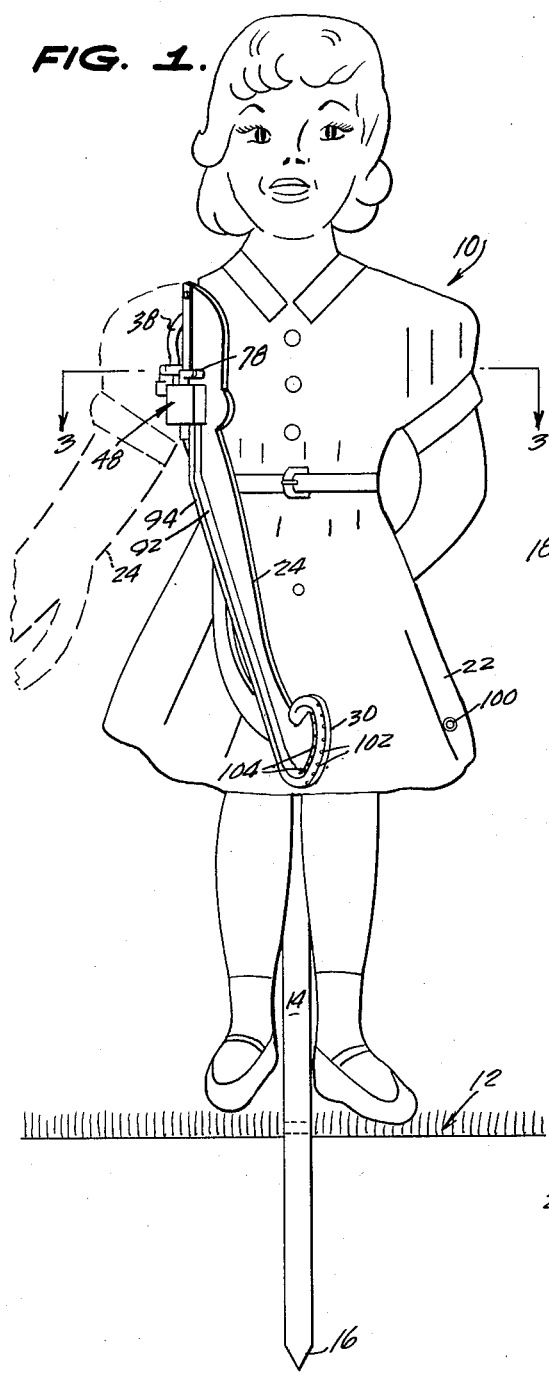
Figure 1 is a front elevational view of a lawn sprinkler constructed in accordance with the present invention, Figure 1 including a simulated human figure having one of its respective arms pivotally connected to the torso of the figure and extending forwardly thereof.

Referring now more specifically to the drawings, wherein like reference numerals have been used throughout the several views to designate like parts, reference numerals 10 designates, in general, a water sprinkler constructed in accordance with the teachings of the instant invention, the sprinkler 10 being designed for support on a ground surface generally indicated at 12.

The water sprinkler 10 includes an elongated substantially rectangular rigid standard 14 having a ground engaging pointed end 16. The other end of the standard 14 terminates in a curvilinear handle 18 which, when taken together with a flange 20 disposed adjacent the pointed end 16 comprise hand and foot means for effecting leverage on the standard 14 to facilitate its insertion into the ground 12. The handle 18 also serves as lever means for effecting the withdrawal of the pointed end 16 from the ground 12 when it is desired to discontinue the operations of the springler 10 or when the same is to be transported to another site.

Figure 2:
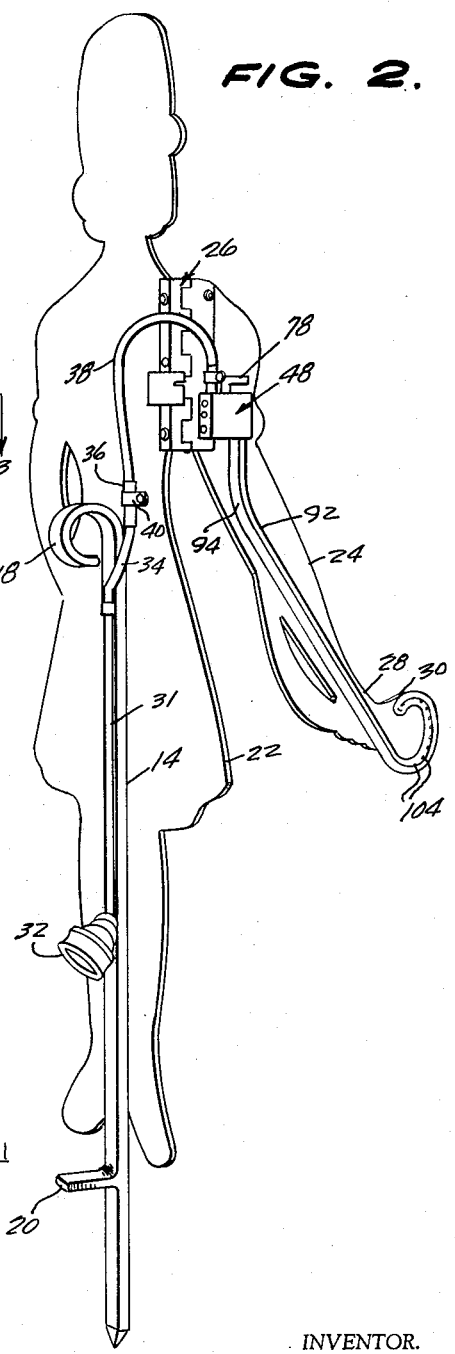
Figure 2 is a rear perspective view of the lawn sprinkler illustrated in Figure 1.

Carried by the standard 14 is a vertical or upright body plate 22 having a configuration simulating a clothed human figure, the plate 22 including a laterally projecting arm 24 mounted for swinging movement thereon by means of a vertical axis hinge 26 from a position in front of the body plate as is illustrated in Figure 1 of the drawings to a position substantially in the plane of the body plate as is exemplified by the broken lines of Figure 2.

The lower end of the arm 24 terminates in a simulated hand portion 28 which is depicted as grasping a simulated lawn sprinkler nozzle 30.

Fixedly secured to the standard 14 by conventional means and extending axially over a portion of its length is an elongated substantially hollow cylindrical conduit 31 having a conventional hose coupler 32 secured to one end thereof. The other or upper end of the conduit 31 is provided with an offset portion 34 which is connected through a connector 36 to one end of a flexible conduit 38. A bracket 40 rigidly secures the connector 36 to the rear or unembellished side of the plate 22.

The other end of the flexible conduit 38 connects, through a reducing nipple 42 with an inlet passage 44 which extends transversely into the main body portion 46 of an elongated substantially rectangular reversing valve denoted in general by reference numeral 48. The passage 44 is in open communication at vertically spaced intervals with one of the ends of a pair of longitudinally extending passages 50, 52 disposed substantially perpendicularly thereto, the other ends of the passages 50, 52 opening outwardly of the main body portion 46 through passage extensions 54, 56, respectively, disposed in spaced relation relative to each other and are substantially parallel to the passage 44. A needle valve 58 extends inwardly from one end of the main body portion 48 adjacent the nipple 42 and is adapted for extension or retraction across the passage 44 to control the water flow therethrough.

A fluid distributing valve element 60 is seated for rotation within the main body portion 48 and extends transversely across the passages 50, 52 and is provided with a pair of diametrically extending bores 62, 64 which extend transversely therethrough with the axis thereof disposed at right angles with respect to each other. As will become more apparent below, the bores 62, 64 are adapted to be aligned with the passages 50, 52 in an alternate sequential series of operations.

Adjacent the lower end of the distributing valve element 60 is provided a quadrant shaped recess 66 (see Figure 8) having opposed sides 68, 70 arranged at right angles with respect to each other to serve as abutment means for one end of a pin 72 having a threaded end 74 which is threadedly received in one end 76 of the main body portion 48. The other end of the distributing valve element 60 is formed with an actuating lever 78 which projects laterally therefrom and at substantially right angles with respect thereto, the longitudinal axis of the lever 78 being substantially parallel to the axis of the bores 62.

In the arrangement shown in Figures 6 to 8, inclusive, the pin 72 engages the side 70 of the recess 66 to effect registry of the bore 62 with the passage 50. On the other hand, if the lever 78 is rotated ninety degrees, the pin 72 will engage the side 68 of the recess 66 and turn the bores 62, 64 the same number of degrees whereby the bore 62 is moved out of registry with the passage 50 while the bore 64 is brought into registry with the passage 52.

Bolts 80 or other conventional means serve to secure the main body portion 46 of the valve 48 to the arm 24 adjacent the hinge means 26.

To the body plate 22 is fixedly secured a valve lever actuating bolt or other similar element 82 which projects forwardly thereof (or outwardly from the embellished side of the plate 22) which is loosely received in and projects transversely through and beyond an elongated substantially rectangular slot 84 to engage against the lever 78 to turn the same from the position shown in Figure 3 to the position of the lever illustrated in Figure 4 when the arm 24 pivots in the direction of the arrows as shown in Figure 3 to its extended position across the body plate 22 shown in Figure 4.

Rigidly secured to the rear or unembellished side of the plate 22 is one end of an arcuate resilient element 86 which extends across the hinge 26 in spaced relation with respect thereto, the other end of which terminates in a forwardly projecting button 88 having a stem 90 which is disposed in the arcuate path of movement of the lever 78 for engagement therewith as the arm 24 pivots from its position shown in Figure 4 to its position shown in Figure 5, the path of this last mentioned movement being indicated by the directional arrows shown in Figure 5. As the stem 90 engages the lever 78 the latter rotates to its original position as is illustrated in Figures 3 and 5 of the drawings.

Referring now to Figures 3, 5 and 6, the lever 78 is shown as being substantially parallel to the axis of the passage 50 and the bore 62 is aligned therewith. Thus, water passes through the passages 44, 50 and the bore 62 and through the passage extension 54. No water will pass through the passage 52 nor its extension 56 since the bore 64 is disposed substantially perpendicular to the axis of the passage 52. Now, however, when the arm 22 slings or pivots to its position shown in Figure 4, the lever 78 has engaged against the valve lever actuating bolt 82 and rotates the same ninety degrees to move the bore 62 out of alignment with the passage 50 to effect co-axial alignment of the bore 64 with the passage 52 whereby water passes therethrough from the passage 44 and through the passage extension 56.

Reference numerals 92, 94 designate a pair of elongated substantially hollow tubular conduits disposed in side-by-side relation and having one of their respective ends connected to the passage extensions 54, 56, respectively, and extend longitudinally of and are secured by conventional means to the arm 24. The other ends of the conduits have reversely curved terminal ends 96, 98 fixedly secured to the reversed or unembellished or unembossed side of the arm 24 by conventional means 100. As is seen in the drawings, the reversely curved terminal ends 92, 94 are rigidly connected to the simulated lawn sprinkler nozzle 30 and are substantially concentric relative to each other. As is seen more clearly in Figure 10, a portion of the terminal end 98 projects beyond the outer peripheral edge of the simulated nozzle 30 and is provided with a plurality of curvilinearly spaced jet nozzle orifices 102 which open in a direction forwardly of the arm 24. The terminal end 96 is also provided with jet nozzle orifices 104 which are directed in the reverse direction or rearwardly of the arm 24.

From the above specification, the mode of operation of this device is deemed self-evident, but as an aid in the understanding thereof its operation is set forth in detail below.

The water sprinkler 10 is moved, as a unit, to a preselected position on the lawn to be watered after which the operator jams the pointed end 16 of the standard 14 into the ground 12, and by applying manual pressure on the handle 18 and foot pressure on the flange 20 the standard 14 is forced into the ground, preferably until the flange 20 engages thereagainst to limit the further downward movement thereof (see Figure 1).

One end of a conventional hose (not shown) is connected with the connector 32, while the other end of the hose is connected with a source of water under pressure. In most conventional lawn sprinkling arrangements, a control valve is interposed between the source of water supply and the hose, per se, this control valve being normally in its closed position. Assuming in the instant case that this same arrangement is present, the operator opens the control valve to permit water to be supplied from the source to the conduit 31. Water under pressure is conduced from the conduit 34 and the connector 36 and through the flexible conduit 38 for entry into the passage 44 of the valve 48.

Assuming for the moment that the arm 24 is in its position as is illustrated in Figures 1 to 3, inclusive, and the valve lever 78 is in its position as shown in Figures 3 and 6, water passes from the passage 44 through the passage 50 and the bore 62 of the distributing valve 60 and is discharged from the passage extension 54 into the inlet end of the conduit 92. This flow of water passes into the curvilinear terminal end 96 and is discharged through the jet orifices 104 to create a force or jet action which tends to move the arm 24 from its position as shown in Figure 3 towards and to the position thereof as is illustrated in Figure 4. As the arm 24 swings to its extended position across the plate 22, the lever 78 impinges against the free end of the valve actuating lever bolt 82 which tends to rotate the same in a clockwise direction (as viewed in Figure 4) until the arm 24 reaches its fully extended position across the front or embossed side of the plate 22. As this action takes place, the lever 78 pivots until the side 68 of the recess 66 impinges against the pin 72 to limit further pivotal movement of the lever 78 and the valve element 60.

As the valve element 60 moves to decrease the flow of water through the bore 62, the pressure of the same as discharged from the orifices 104 diminishes and slows down the above described swinging movement of the arm 24 until the bore 62 is moved to its fully closed position transversely of the passage 50 and, the arm 24 completes its swinging movement under the force of inertia until the same strikes against the stop or abutment member 100 which projects forwardly of the plate 22.

It will be immediately recognized by those skilled in this art that as the bore 42 is rotated out of alignment with the passage 50, there is a simultaneous rotation of the bore 64 to gradually bring the same into registry or alignment with the passage 52 which, as has been described above, is also in open communication with the passage 44. Thus, after the movement of the arm 24 in the direction of the arrows shown in Figure 3 has been arrested, the bore 64 now freely permits the passage of water through the passage 52 and its extension 56 and into the conduit 94. The water as it passes through the conduit 94 is discharged through the forwardly opening jet orifices 102 to create a jet action or force which reacts in such a manner as to cause the arm 24 to reverse its direction of swinging movement and to follow the path of movement as is indicated by the arrows in Figure 5.

Now, as the arm 24 pivots away from the plate 22 to assume a substantially coplanar relationship with respect thereto, the adjacent side of the valve actuating lever 78 engages against the stem 90 of the button 88 which yieldingly engages thereagainst and forces a gradual rotation or pivotal movement of the lever 78 in a counterclockwise direction (reference being made to Figure 5) to move the lever 78 into its original position and to substantially simultaneously therewith yieldingly resist any further clockwise movement of the arm 24 in this direction under the force of inertia.

The return of the lever 78 to the position thereof as is illustrated in Figures 3, 4 and 6, re-establishes communication between the passages 44 and 50 through the bore 62 while substantially at the same time destroys or effects misalignment or registry of the bore 64 with the passage 52. Consequently, water is now again discharged from the jet nozzles or orifices 104 to effect a reverse pivotal movement of the arm 24 in the direction indicated by arrows in Figure 3 of the drawings.

It will be apparent to those who have had previous experience with watering of lawns that the instant invention simulates the manual movement of the operator's arm and the hose nozzle from one side to another to insure a substantially equal distribution of the sprayed water over the lawn.

Water pressure at the discharge orifices 102, 104 is controlled by the adjustment of the needle valve 58 which, in turn, determines the throw of the sprayed water with respect to the standard 14.

When it is desired to water or sprinkle a different plot of ground, the water supply to the conduit 31 is cut off by the conventional valve means (not shown) set forth above and, depending upon the circumstances, the hose is disconnected from the coupling 32 at the direction of the user. With the water being shut off, the user grasps the curved handle 18 and by exerting alternate sidewise pressures thereon, the standard 14 may be easily broken from the earth 12 and the same re-inserted in the ground at another desired preselected position, after which the sprinkling device is again supplied with water under pressure as described supra.

Having described and illustrated one embodiment of this invention in detail, it will be understood that the same is offered merely by way of example, and that the instant invention is to be limited only by the scope of the appended claims.

What is claimed is:

1. A water sprinkler comprising an upright stationary body plate, a laterally projecting arm pivotally connected to said body plate on a vertical axis adjacent one edge of said plate, said arm in its normal starting position being disposed in the same transverse plane as said body plate and being swingable transversely across a side of said body plate and returnable to its said normal starting position, a valve fixedly secured to the back of said arm, said valve having a main body portion including a water passage extending inwardly from an end thereof and a pair of water discharge passages having one of their respective ends in open communication with said water inlet passage and their respective other ends discharging water externally of said main body portion, a water distributing valve element extending inwardly from said one end of said main body portion and being rotatable therein about an axis substantially parallel to the vertical axis of said pivotal connection, said element extending transversely through said water discharge passages, said element having a pair of right angularly disposed bores extending transversely therethrough for alternate alignment with each, respectively, of said discharge passages, said bores being perpendicular with respect to each other, a valve element operating lever rigidly secured to one end of said valve element adjacent said one end of said main body portion with the longitudinal axis thereof substantially perpendicular to the axis of said element, said arm having an opening extending transversely therethrough and confronting said lever, a valve lever actuating element projecting from one side of said body plate for reception through said opening to engage an end of said lever and turn the same through an arc of substantially ninety degrees when said arm extends transversely across said body plate whereby one of said bores is moved out of alignment with one of said water discharge passages and the other of said bores is moved into alignment with the other of said passages to effect water discharge therethrough, means fixedly secured to said body plate and extending in the path of travel of said valve lever when said arm is pivoted from its transverse position across said body plate into the same transverse plane as said body plate, said means engaging said lever to rotate said end of said valve element to turn said last named bore out of alignment with said last named passage and to realign said first named bore with said first named passage, a pair of conduits each having, respectively, one of their ends connected with said discharge passages, said last named conduits being secured to said arm on one side thereof and terminating in jet stream orifices to discharge water therefrom, alternately, on opposite sides of said arm as said valve element is rotated in one direction through an arc of ninety degrees and in the opposite direction through substantially the same arc.

2. A water sprinkler as defined in claim 1, and means for preventing the throw of said valve element through a rotation of more than ninety degrees in either direction.

3. A water sprinkler as defined in claim 2, wherein said last named means includes a pin extending through said main body portion of said valve, and said valve element being formed with a quadrant-shaped recess extending inwardly from its side and adapted to receive said pin therein.

4. A lawn sprinkler as defined in claim 3, and water pressure regulator means, said water pressure regulator means comprising a needle valve adjustably secured on said main body portion of said valve and having an end portion thereof extendable across said water inlet passage ahead of said water discharge passages.

5. A water sprinkler as defined in claim 4, and means projecting from and secured to said one side of said body plate to arrest the pivotal movement of said arm as it pivots transversely thereacross.

6. A water sprinkler as defined in claim 4, and said last named valve lever operating means being resiliently connected on said body plate to gradually arrest the swinging movement of said arm as said valve lever engages thereagainst.

7. A water sprinkler as defined in claim 6, wherein said last named valve lever operating means comprises an arcuately shaped resilient element having an end thereof fixedly secured to said body plate and extends across said vertical hinge means in spaced relation relative thereto, and the other end of said resilient member being disposed in the swinging path of movement of said valve actuating lever.

8. A fluid sprinkler comprising an upright stationary body plate having a pin projecting laterally from one side thereof, an arm extending from an edge of said body plate and pivotally connected thereto for swinging movement about a vertical axis, said arm being swingable from a first or normal starting position wherein it is disposed in the same transverse plane as said body plate to a second position wherein said arm extends across said one side of said body plate, said arm having an opening extending transversely therethrough adapted to receive said pin therein as said arm moves into and assumes its second position, said pin being of such length as to project beyond the outer side of said arm when the latter is in its second position, a two-way fluid discharge valve connectable with the source of fluid under pressure, a valve actuating lever for said valve, said lever being pivotal about an axis substantially parallel to said axis of said pivotal connection, said lever being disposed in confronting relation relative to said opening, a pair of conduits fixedly secured to said arm and connected with the discharge side of said valve, said conduits, respectively, having fluid jet stream orifices directed towards opposite sides of said arm, abutment means fixedly connected to said body plate and spanning said pivotal connection, said abutment means being disposed in the swinging path of travel of said lever, said lever being disposed in a first position when said arm is in its said first position to supply fluid under pressure to one of said conduits whereby said arm is driven to swing across said side of said body plate to effect engagement of said lever with said pin whereby said lever is turned to a second position causing said valve to cut off said fluid supply to said first conduit and to connect said fluid supply with said second conduit whereby the swinging movement of said arm is reversed, said reverse movement of said arm terminating upon engagement of said lever with said abutment to cause said lever to pivot to its said first position thereby disconnecting said fluid supply from said second conduit and reconnecting it with said first conduit.

9. A fluid sprinkler comprising an upright stationary body plate having a pin projecting laterally from one side thereof, an arm extending from an edge of said body plate and pivotally connected thereto for swinging movement about a vertical axis, said arm being swingable from a first or normal starting position wherein it is disposed in the same transverse plane as said body plate to a second position wherein said arm extends across said one side of said body plate, said arm having an opening extending transversely therethrough adapted to receive said pin therein as said arm moves into and assumes its second position, said pin being of such length as to project beyond the outer side of said arm when the latter is in its said second position, a two-way fluid discharge valve connectable with the source of fluid under pressure, a valve actuating lever for said valve, said lever being pivotal on an axis substantially parallel to said axis of said pivotal connection, said lever being disposed in confronting relation relative to said opening, a pair of conduits fixedly secured to said arm and connected with the discharge side of said valve, said conduits, respectively, having fluid jet stream orifices directed towards opposite sides of said arm, abutment means fixedly connected to said body plate and spanning said pivotal connection, said abutment means comprising a resilient member having an end thereof fixedly secured to said body plate and a free end spanning said pivotal connection and being disposed in the swinging path of travel of said lever, said lever being disposed in a first position when said arm is in its said first position to supply fluid under pressure to one of said conduits whereby said arm is driven to swing across said one ide of said body plate to effect engagement of said lever with said pin whereby the lever is turned to a second position causing said valve to cut off said fluid supply to said first conduit and to connect said fluid supply with said second conduit whereby the swinging movement of said arm is reversed, said reverse movement of said arm terminating upon engagement of said lever with said abutment to cause said lever to pivot to its said first position disconnecting said fluid supply from said second conduit and reconnecting it with said first conduit.

10. A fluid sprinkler as defined in claim 9, and means for limiting the pivotal movement of said lever in either direction.

11. A fluid sprinkler as defined in claim 10, and fluid pressure regulating means for said valve.

References Cited in the file of this patent

UNITED STATES PATENTS

| | | |
|---|---|---|
| 692,170 | Wallerstein | Jan. 28, 1902 |
| 937,276 | Ashley | Oct. 19, 1909 |
| 2,534,577 | Courtat | Dec. 19, 1950 |
| 2,631,060 | Cook | Mar. 10, 1953 |